US010015528B2

(12) United States Patent
Kunisetty et al.

(10) Patent No.: US 10,015,528 B2
(45) Date of Patent: Jul. 3, 2018

(54) METHODS AND SYSTEMS FOR GENERATION OF DYNAMIC MULTICAST CHANNEL MAPS

(71) Applicant: ARRIS Enterprises LLC, Suwanee, GA (US)

(72) Inventors: Sridhar Kunisetty, Fremont, CA (US); Vinay Kalra, San Jose, CA (US); Robert Linwood Myers, Mississauga (CA); Niranjan R. Samant, Lansdale, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/394,697

(22) Filed: Dec. 29, 2016

(65) Prior Publication Data

US 2017/0353744 A1    Dec. 7, 2017

Related U.S. Application Data

(60) Provisional application No. 62/343,892, filed on Jun. 1, 2016.

(51) Int. Cl.
*H04N 21/266* (2011.01)
*H04N 21/231* (2011.01)
(Continued)

(52) U.S. Cl.
CPC ..... *H04N 21/23109* (2013.01); *H04N 21/266* (2013.01); *H04N 21/2668* (2013.01);
(Continued)

(58) Field of Classification Search
CPC .......... H04N 21/266; H04N 21/26616; H04N 21/2668; H04N 21/6405; H04N 21/6408
See application file for complete search history.

(56) References Cited

U.S. PATENT DOCUMENTS 5,684,800 A    11/1997  Dobbins et al.
7,742,407 B2    6/2010  Versteeg et al.
(Continued)

OTHER PUBLICATIONS

PCT International Search Report & Written Opinion, Re: Application No. PCT/US2017/033150, dated Jul. 21, 2017.
(Continued)

*Primary Examiner* — Robert J Hance
(74) *Attorney, Agent, or Firm* — Stewart M. Wiener

(57) ABSTRACT

A server structure (101) includes one or more multicast servers (106). An analytics engine (207) determines one or more channel maps (217) identifying a group of channels that will be delivered by the multicast servers across a network (104). The analytics engine determines the one or more channel maps as a function of both historical data corresponding to one or more client groups (204,205,206) operating in one or more zones (201,202,203), and optionally from near real time data such as electronic program guide metadata provided by an electronic program guide metadata manager (213). A flap detector (210) can determine one or more flapping thresholds (405,406,407) identifying channels in the group of channels delivered by the multicast servers, as well as whether channels having flapping frequencies greater than the flapping threshold should remain in the group of channels delivered by the multicast servers.

18 Claims, 7 Drawing Sheets

(51) Int. Cl.
  *H04N 21/6405* (2011.01)
  *H04N 21/466* (2011.01)
  *H04N 21/2668* (2011.01)
  *H04N 21/6408* (2011.01)

(52) U.S. Cl.
  CPC ... *H04N 21/26616* (2013.01); *H04N 21/4667* (2013.01); *H04N 21/6405* (2013.01); *H04N 21/6408* (2013.01)

(56) References Cited

U.S. PATENT DOCUMENTS

| | | | |
|---|---|---|---|
| 8,813,144 B2 | 8/2014 | Davis et al. | |
| 8,887,214 B1 | 11/2014 | Black et al. | |
| 9,742,905 B1* | 8/2017 | Schneider | H04M 3/007 |
| 2004/0264500 A1 | 12/2004 | Bansal et al. | |
| 2007/0136735 A1 | 6/2007 | Hisatomi | |
| 2007/0143808 A1* | 6/2007 | Agrawal | H04N 7/17318 725/119 |
| 2011/0137835 A1* | 6/2011 | Ito | G06K 9/00335 706/12 |
| 2011/0302320 A1* | 12/2011 | Dunstan | G06F 17/30017 709/235 |
| 2013/0232267 A1 | 9/2013 | Shatzkamer et al. | |
| 2014/0189730 A1 | 7/2014 | Craner | |
| 2014/0233587 A1 | 8/2014 | Liu et al. | |
| 2015/0288733 A1* | 10/2015 | Mao | H04L 65/4076 709/219 |
| 2015/0288997 A1 | 10/2015 | Basra | |
| 2016/0044080 A1 | 2/2016 | DuBreuil | |

OTHER PUBLICATIONS

"IP Multicast Adaptive Bit Rate Architecture Technical Report", CableLabs Technical Report OC-TR-IP-MULTI-ARCH-V01-141112.

* cited by examiner

METHODS AND SYSTEMS FOR GENERATION OF DYNAMIC MULTICAST CHANNEL MAPS

CROSS REFERENCE TO PRIOR APPLICATIONS

This application claims priority and benefit under 35 U.S.C. § 119(e) from U.S. Provisional Application No. 62/343,892, filed Jun. 1, 2016, which is incorporated by reference for all purposes.

BACKGROUND

Technical Field

This disclosure relates generally to content delivery systems, and more particularly to content delivery systems employing channel maps.

Background Art

Systems delivering multimedia content, such as videos, movies, and traditional television programs, is constantly evolving. Illustrating by example, not too long ago television sets received multimedia content across the air through an antenna. Today, "video on demand" systems allow users to stream movies and television programs at the time of their choosing to any of a number of devices including televisions, computers, laptop computers, tablet computers, and even mobile telephones.

One issue associated with multimedia content delivery systems involves the number of available channels across which the content can be delivered. While improved systems such as multicast adaptive bit rate systems have been developed to improve efficiency and save bandwidth and network costs in content delivery systems, channel limitations still exist. For instance, in cable-based systems capacity limitations exist due to limited installed resources available for content delivery and also due to the standards with which such systems operate, with one example being the Data Over Cable Service Interface Specification (DOCSIS). In addition, the underlying protocols such as NACK-Oriented Reliable Multicast (NORM) used in multicast delivery add overhead. Thus, in practice the number of channels used in multicast delivery is often limited to, for example, twenty channels. This limitation exists despite the fact that there may be five hundred or more content carrying channels available through the system. It would be advantageous to have improved systems and methods to more efficiently use the limited number of multicast channels available in the system.

Figure 1:
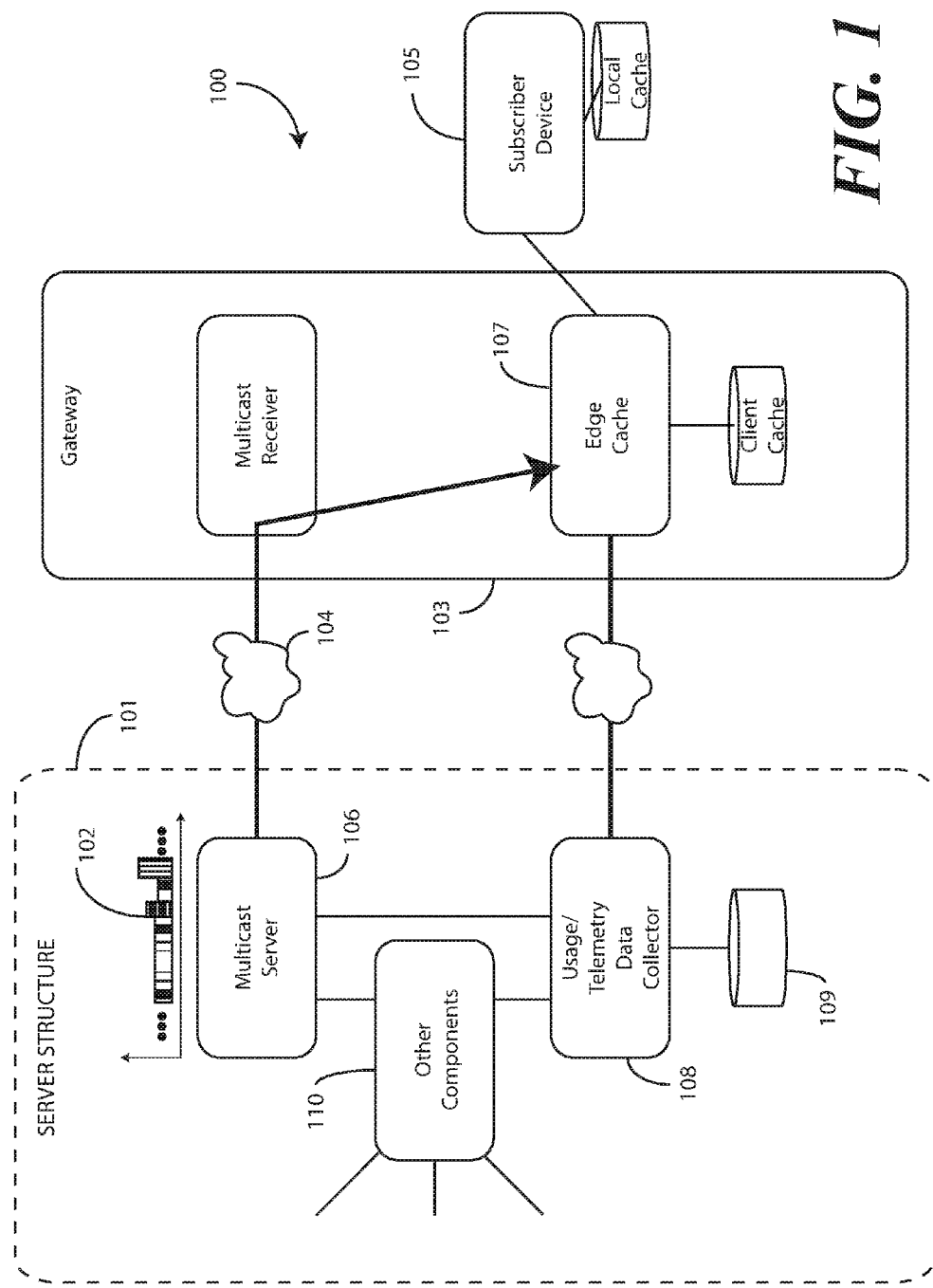
FIG. 1 illustrates one explanatory system in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to predicting the best channels to multicast when those channels change as a function of time and geography, i.e., for each time period of a day embodiments of the disclosure predict the best or most optimal multicast channel map for a particular geographic zone. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of dynamic channel map creation as described herein. The non-processor circuits may include, but are not limited to, a data receiver, a data transmitter, signal drivers, clock circuits, power source circuits, and user input devices. As such, these functions may be interpreted as steps of a method to perform analytics based updating of networked electronic devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to networks of electronic devices in communication across an infrastructure to optimize the multicast delivery of a subset of a number of channels as a function of historical data, flapping thresholds, channel popularity, and other factors, improve the functioning of these electronic devices by improving the overall user experience to overcome problems specifically arising in the realm of content delivery to electronic devices in adaptive bit rate systems and reducing the overall cost associated with content delivery to users.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

As noted above, multicast adaptive bit rate systems can improve efficiency and save bandwidth and network costs when used in Internet protocol video (IP Video) content delivery systems. This efficiency is achieved when the system streams one copy of a video content via multicast to multiple users rather than multiple copies of the same video content via unicast to each of them.

Despite the increased efficiency offered by multicast adaptive bitrate systems, these systems still suffer from limitations. For instance, in cable-based systems capacity limitations exist due to limited installed resources available for content delivery and also due to the standards with which such systems operate, with one example being the Data Over Cable Service Interface Specification (DOCSIS). In addition, the underlying protocols such as NACK-Oriented Reliable Multicast used in multicast delivery adds overhead and so to effectively use multicast, the advantages should outweigh the overhead i.e., if the same video content can be delivered though multicast to more number of users, then it is more advantageous. So, in practice the number of channels used in multicast delivery is often limited to, for example, twenty channels. Typically these twenty channels are the most popular channels so as to take full advantage of the benefits of using multicast.

Due to this, system purveyors desire to understand what subset of channels should be selected for multicasting to achieve optimum efficiency. Some prior art systems do this, for example, by simply identifying the twenty "most popular" channels and multicast the same. Some systems monitor channel usage in real time in an attempt to identify those channels that appear to be most popular. Some systems attempt to do this within various geographic zones, as channel popularity can change dynamically with time and geographic region.

Illustrating by example, some prior art multicast adaptive bitrate systems employ complex, resource intensive, expensive equipment to monitor channel usage occurring at all gateways to which content is being delivered at a given time. Other complex, expensive, resource intensive systems then calculate channels perceived as being "popular" from this real time data to prepare multicast "channel maps." A channel map identifies which channels should be multicast in a system where only a subset of channels can be multicast at a given time. The systems then provide the multicast channel map to a multicast controller. The multicast controller, with the help of multicast servers, selects the channels to be multicast from the channel map, and then delivers them via multicast to receiving devices rather than by unicast transmission.

While monitoring channel usage in real time can have some beneficial impact on multicasting channel efficiency, this process suffers from several drawbacks. To begin, real time monitoring of channel usage is costly and resource intensive. Sophisticated electronic monitoring systems with large memories and complex processors are required to monitor—on real time—to what channels thousands and thousands of electronic devices are tuned.

Second, real time monitoring systems can actually be counterproductive, i.e., can reduce system efficiency, in instances of high channel "flapping," which is a condition that occurs when a user of an electronic device switches channels frequently after being tuned to each channel for only a short duration. For instance, in a group of channels that is selected to be multicast, prior art systems generally order the channels by popularity, with the first channel being the most popular and the last channel being the least popular in the selected group. In many situations, the channels at the top portion, e.g., the top eighty percent of channels will remain relatively stable in terms of popularity. As time progresses, the position of a channel in the top eighty percent may change, but those channels will remain in the most popular group of channels.

At the same time, due to the fact that devices sometimes tune in and out of channels quickly for short durations, some channels in the bottom twenty percent will fall out of the "most popular" group to be replaced by others previously not in the most popular group. This "flapping," i.e., rapid changing and/or flipping of channels can result in one or more channels falling out of the most popular category momentarily. Moments later, the channel jumps back into the most popular category. Typically, when a channel is "flapped-out," the prior art system will stop multicasting that channel, and instead will start multicasting something perceived to be more popular. While unavailable by multicast, the channel will be available only via unicast. When the channel is the "flapped-in," which could occur mere seconds later, the system will again start multicasting the channel.

Where this "in-and-out" phenomenon happens with respect to a particular channel within a few seconds, it creates a problem. Specifically, the multicast process becomes less efficient. Additionally, switching between the channels and associated protocols creates additional overhead and potential unicast bursts. Conventional systems have no mechanism for addressing this flapping problem. Where high channel flapping rates occur, prior art systems can misidentify more popular channels as less popular channels. This results in less popular channels being multicast, which decreases system efficiency rather than increasing it.

Advantageously, embodiments of the present disclosure overcome the deficiencies associated with prior art systems, including complexity, cost, and the inability to address channel flapping problems. Embodiments of the present disclosure work to predict optimized channel maps for particular times and for particular geographical areas for each period of a day. Embodiments of the disclosure also work to predict optimized channel maps in particular neighborhoods or similar geographical zones to increase multicast streaming efficiencies in multicast adaptive bit rate content delivery systems. Moreover, embodiments of the disclosure can be used in place of—or in conjunction with—prior art systems to increase overall system efficiency.

Another advantage offered by embodiments of the disclosure is that the systems and methods described below work to reduce or significantly eliminate the channel flapping problem associated with prior art systems. The flapping problem causes channels that are on the "borderline" of popularity to toggle frequently between multicast and unicast. This has a direct impact on the whole system, as it increases overhead and cost to the overall system, as well as increasing overhead in Internet Group Management Protocol (IGMP) join and leave traffic of the system due to the constant toggling of channels between unicast and multicast.

The latter overhead increase occurs due to the fact that when an electronic device joins a multicast channel, they must perform an IGMP-Join operation. This operation requires processing overhead at the system headend. Similarly, when the electronic device leaves a multicast channel, it must perform an IGMP-Leave operation, which also requires processing overhead at the system headend. Flapping exacerbates this issue due to the fact that each multicast gateway client performs more IGMP Join/Leave operations.

In addition to overhead inefficiencies, the flapping problem causes an increase in the occurrence of initial unicast burst segments when a particular channel is only available via unicast. This requires the system to build in additional capacity to handle the burst traffic, which directly counters any advantages offered by multicasting. What's more, system capacity becomes wasted due to the inefficiency associated with the constant toggling of a few channels between multicast and unicast. This problem gets worse as the number of multicast zones increases.

Yet another advantage offered by embodiments of the disclosure concerns processing overhead and cost associated with channel usage monitoring. While prior art systems are required to collect channel usage and/or telemetry data in real time, e.g., collecting data once every ten seconds, embodiments of the disclosure allow the collection of this data with less frequency, e.g., once every one minute or longer. This saves system resources and operational costs. Were a conventional system altered to collect data at such long time intervals, it would no longer be a real time system and thus would miss many channel switches since the changing of channels requires only a few seconds. Conventional systems would therefore not work normally or efficiently where data collection occurs at such long intervals due to the fact that operational performance is predicated on real time usage data.

Embodiments of the disclosure also reduce system overhead compared to prior art systems. Conventional systems require many, expensive servers capable of real time data processing. These servers must also be able to handle surges in traffic and or usage, which requires high availability capacity and redundancy. In short, one must add even more expensive servers to ensure that the system remains operational. When administration and maintenance costs are included, such prior art systems are expensive.

Advantageously, embodiments of the present disclosure provide systems, apparatuses, and methods to predict the best channels to multicast over changes in time and over geography to predict the multicast channel map at a neighborhood/zone level granularity. Embodiments of the disclosure can complement (or replace) a conventional real-time channel monitoring mechanisms. Illustrating by example, since embodiments of the present disclosure can predict with adequate reliability that channel X will be a popular channel at a particular time, the automatic addition of channel X to a multicast group allows any real time monitoring operations to skip channel X and monitor other channels. This advantageously works to reduce the number of channels monitored by any real time monitoring equipment that may be operating in a given system.

Further, and advantageously, embodiments of the disclosure provide systems, apparatuses, and methods to eliminate or reduce flapping problems that exist in conventional real time channel monitoring mechanisms. Embodiments of the present disclosure work to improve efficiency and save bandwidth and network cost associated with the delivery of multimedia content to client devices.

In one embodiment, a system configured in accordance with embodiments of the disclosure uses historical data to prepare multicast channel maps with a given geographical zone and/or time of day granularity. In one embodiment, the system predicts a flapping thresholds above which flapping is discounted or not considered to address the flapping problem. As noted above, this and other embodiments of the disclosure can augment and/or replace any real-time monitoring solutions that may be operational.

Additionally, in one embodiment a system configured in accordance with one or more embodiments of the disclosure is able to address two problems simultaneously, namely, the problem of choosing the optimal multicast channel map at a particular time for a particular zone and group of subscribers so as to operate a multicast content delivery system efficiently, and reducing the amount of network traffic caused by the telemetry to determine channel usage and the additional "burstiness" caused by the protocol change to/from unicast. Further embodiments provide for the use of historical data to determine popular channels in constructing a suitable multicast channel map, in combination with the use of analytics to reduce a burden on the telemetry data collection system and predict channel maps to reduce flapping. Still other advantages will be obvious to those of ordinary skill in the art having the benefit of this disclosure.

Turning now to FIG. 1, illustrated therein is one explanatory system 100 configured in accordance with one or more embodiments of the disclosure. The system 100 of FIG. 1 is a "multicast" content delivery system in that at least some content 102 is delivered to remote devices, e.g., gateway 103, via multicast across a network 104 from a multicast server 106. The content 102 is digital content in one or more embodiments, and can be data, media, files, and/or any other form of data such as video, audio, images, text, electronic books, games, and/or any other type of data.

The gateway device 103 can be a device disposed across the network 104 from the server structure 101. In one or more embodiments, the gateway 103 facilitates or enables communication between the client device(s) served by the gateway 103 and the server structure 101. Illustrating by example, one or more processors of the server structure 101 can associate a particular client device 105 with a particular subscriber of its services through the gateway 103. Examples of gateway 103 devices can include routers, modems, cable boxes, streaming media servers, set-top boxes, home media servers, data management systems, digital video recorder (DVR), and so forth.

The gateway 103 can serve one or more client devices 105. Examples of client devices 105 include mobile phones, smartphones, tablet computers, desktop computers, laptop computers, televisions, gaming devices, personal media devices, set-top boxes, or any other device that can receive digital content over the network 104 for playback, storage, and/or processing. Other types of client devices will be obvious to those of ordinary skill in the art having the benefit of this disclosure.

One or more intermediate network servers or other devices may be communicatively coupled between the server structure 101 and the one or more gateway 103 devices in one or more embodiments as well. The illustrative structure of the system 100 of FIG. 1 is explanatory only. Other configurations will readily be obvious to those of ordinary skill in the art having this disclosure.

The system 100 is also able to deliver content 102 to the client devices via unicast, with the unicast portions not shown, as they will be readily obvious to those of ordinary skill in the art having the benefit of this disclosure. For example, in unicast operation a client device 105 may look to its local gateway 103, which is sometimes referred to as an "edge" device, to see if requested content is stored in the local cache 107 of the edge device. The edge device can be a hypertext transfer protocol (HTTP) client of a server structure 101 operational with the multicast server 106. Where the requested content is not stored in the local cache 107, the edge device may make an HTTP GET request to the server structure 101. The content can then be delivered from a unicast server (not shown) at the server structure 101 to the gateway 103 to the client device 105.

When thousands of subscriber devices perform such unicast operations for content offerings, bandwidth spikes can be extreme since there are multiple copies of the same content, with one copy being delivered to each subscriber device on a one-to-one basis. Accordingly, in one or more embodiments the multicast server 106 is included. Advantageously, by delivering content 102 via multicast, a single copy of the common content can be delivered to all the subscriber devices consuming that content. This results in lower network bandwidth usage.

In one or more embodiments, the server structure 101 operates as an adaptive bit rate server that includes the multicast server 106 to deliver the same multimedia content in variable bit rates e.g., 480 bits per second (bps), 720 bps, and 1080 bps. In one embodiment, each gateway 103 uses an IGMP command to tune to the multicast server 106. Other methods of subscribing a gateway 103 to an adaptive bit rate multicast server to receive content will be obvious to those of ordinary skill in the art having the benefit of this disclosure.

In short, rather than handling all the HTTP GET commands occurring in a unicast mode of operation, which cause tremendous bandwidth spikes, the multicast server 106 of the system 100 of FIG. 1 advantageously pushes, via multicast, one or more channels to the various gateways 103. In one or more embodiments, the channels multicast to the gateway 103 comprise a subset of the channels available from the server structure 101. If, for example, there are one hundred, two hundred, five hundred, or more channels available from the server structure 101, only a subset thereof, such as ten, twenty, or thirty channels, may be multicast from the multicast server 106 to the gateway 103 due to system limitations or restrictions. By multicasting a subset of the available channels, bandwidth loading and demand on the network from unicasting is relieved.

In one or more embodiments, the server structure 101 also includes a usage/telemetry data collector 108, which can include a corresponding cache 109. The usage/telemetry data collector 108 can poll the various gateway 103 devices to determine to which channels client devices 105 of the gateway 103 devices are tuned, when those client devices 105 tune to different channels, how long the client devices 105 are tuned to particular channels, network bandwidth usage, content usage, and so forth. Additionally, the data queried by the usage/telemetry data collector 108 can be used to determine which channels are more or less popular at given times in given geographical zones as well. In one or more embodiments, the data collected by usage/telemetry data collector 108 is used to calculate which channels are popular from real time data. As will be described in more detail below, in one or more embodiments this information collected by the usage/telemetry data collector 108 can be used to prepare one or more "channel maps" identifying which channels should be delivered by the multicast server 106 and which should be relegated to unicast operations.

In one or more embodiments, the usage/telemetry data collector 108 polls gateway 103 devices and or client devices 105 only at periodic intervals. Alternatively, data is pushed from the gateway 103 devices to the usage/telemetry data collector at periodic intervals. Illustrating by example, in one or more embodiments the usage/telemetry data collector 108 collects data at predetermined intervals such as every minute. This data collection contrasts with prior art systems, in which real time data is collected continuously, i.e., every few seconds. Advantageously, in one or more embodiments the usage/telemetry data collector 108 polls gateway 103 devices at lesser intervals to reduce loading of the system 100 and to provide more flexibility regarding when the usage/telemetry data collector 108 collects data.

Figure 2:
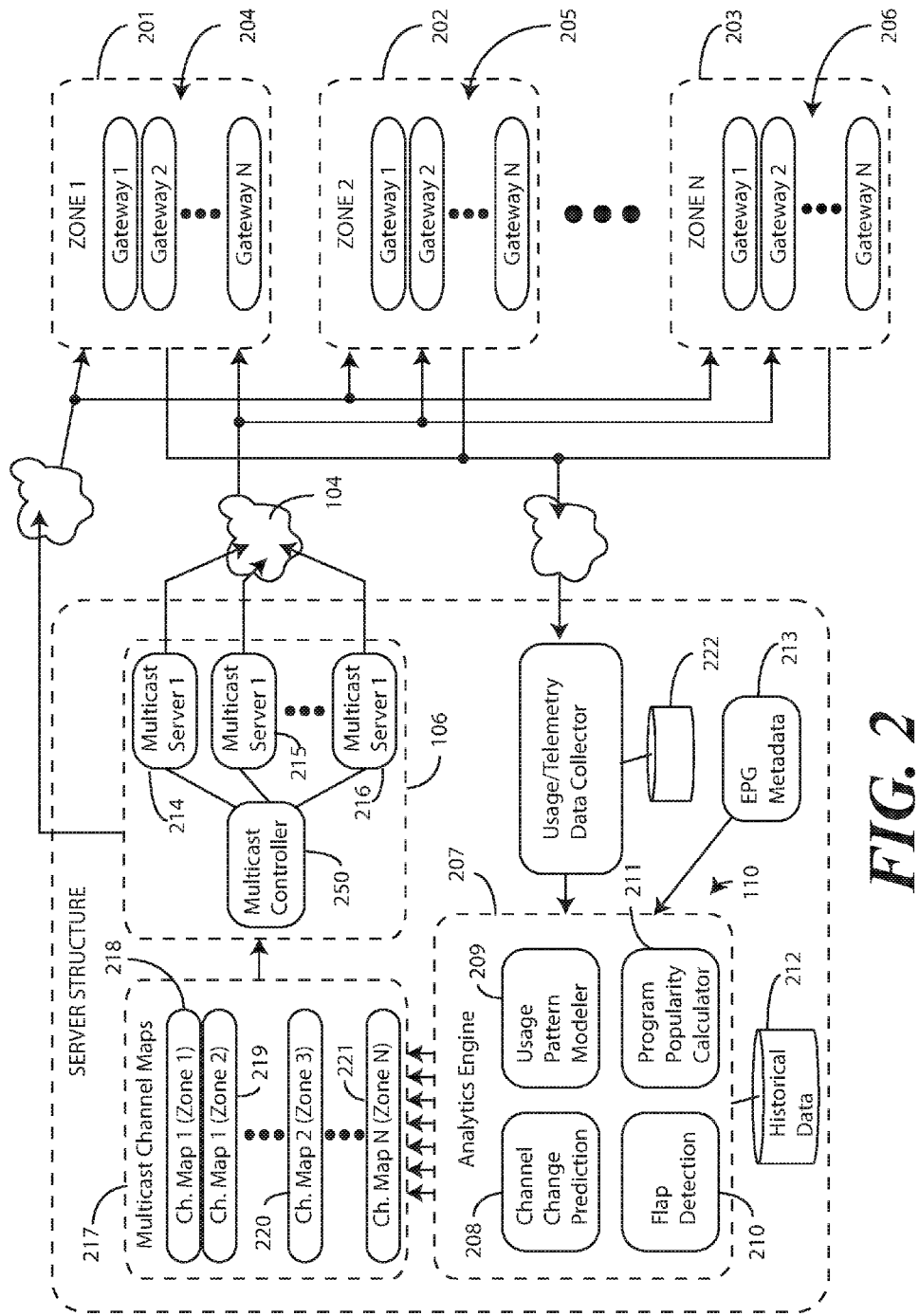
FIG. 2 illustrates another explanatory system in accordance with one or more embodiments of the disclosure.

Other components 110 can be operational with one or both of the usage/telemetry data collector 108 and/or multicast server 106. Turning now to FIG. 2, illustrated therein is a more detailed view of the system 100, which describes some of these other components 110.

In one or more embodiments, the server structure 101 is in communication across the network 104 with one or more client groups 204, 205, 206. Illustratively shown in FIG. 2, each client group 204, 205, 206 may be grouped within a predefined geographical area or "zone." Here, the one or more client groups 204, 205, 206 are thus associated with one or more zones 201, 202, 203, with each zone 201, 202, 203 having one or more client devices operational therein.

In one or more embodiments, the multicast server 106 can comprise one or more servers 214, 215, 216. A multicast controller 250 can be operable with the one or more servers 214,215,216 to stream content (102) to gateway devices disposed in client groups 204,205,206 in different geographical zones 201,202,203. In one or more embodiments, the one or more servers 214,215,216 each comprise adaptive bit rate servers that multicast one or more channels to the client groups 204,205,206 in the different zones 201,202,203 to improve efficiency and save bandwidth and network costs compared to the unicast portions of the system 100 that employ hypertext transfer protocol-based unicast Internet protocol content delivery. This efficiency is achieved when the system streams, via the one or more servers 214,215,216, a subset of channels instead of delivering them in a unicast format directly to a particular electronic device.

In one or more embodiments, the one or more servers 214,215,216 multicast the content (102) without adaptive bitrate protocols. In one or more embodiments, the one or more servers 214,215,216 multicast a predefined number of channels, such as ten channels or twenty channels. Thus, while the system 100 may offer five hundred or more channels, in one embodiment the one or more servers 214,215,216 may multicast to a small subset thereof, such as twenty channels.

In one or more embodiments, the server structure 101 includes an analytics engine 207. The analytics engine 207 can comprise one or more subcomponents. In one illustrative embodiment, the analytics engine 207 comprises a channel change predictor 208, a usage pattern modeler 209, a flap detector 210, and a program popularity calculator 211. In other embodiments, the analytics engine 207 can comprise fewer subcomponents, or more subcomponents. For example, one or more of the channel change predictor 208, the usage pattern modeler 209, the flap detector 210, and the program popularity calculator 211 can be removed and/or replaced with other subcomponents as a function of application. Subcomponents in addition to the channel change predictor 208, the usage pattern modeler 209, the flap detector 210, and the program popularity calculator 211 will be obvious to those of ordinary skill in the art having the benefit of this disclosure. The analytics engine 207 can also be operable with one or more memory devices, such as the historical data database 212, and with other components such as the electronic program guide metadata manager 213.

In one or more embodiments, the analytics engine 207 and/or the channel change predictor 208, the usage pattern modeler 209, the flap detector 210, and the program popularity calculator 211 is a device comprising, but not limited to, one or more processors or processing units, a system memory, and one or more communication bus links coupling various system components including the one or more processors to the system memory. The system bus can take any number of possible bus structures, including a memory bus or memory controller, a peripheral bus, an accelerated graphics port, and a processor or local bus using any of a variety of bus architectures.

The system memory of the analytics engine 207 and/or the channel change predictor 208, the usage pattern modeler 209, the flap detector 210, and the program popularity calculator 211 can be any of a variety of computer readable media. Such media can be any available media that is accessible by the analytics engine 207, and includes both volatile and non-volatile media, removable and non-removable media. The system memory includes computer readable media in the form of volatile memory, such as random access memory (RAM), and/or non-volatile memory, such as read only memory (ROM). The system memory typically contains computer readable instructions and/or program modules such as operating systems and/or application software that are accessible to and/or are presently operated on by the analytics engine 207.

Each of the channel change predictor 208, the usage pattern modeler 209, the flap detector 210, and the program popularity calculator 211 can include one or more processors, one or more memory devices, and a communication device that is operable with the one or more processors. The one or more processors can include a microprocessor, a group of processing components, one or more application specific integrated circuits, programmable logic, or other type of processing device. The one or more processors can be operable with the various other components of the channel change predictor 208, the usage pattern modeler 209, the flap detector 210, and the program popularity calculator 211 as configured in accordance with embodiments of the disclosure.

The one or more processors of any of the channel change predictor 208, the usage pattern modeler 209, the flap detector 210, and the program popularity calculator 211 can be configured to process and execute executable software code to perform the various functions of the server structure 101 as configured in accordance with embodiments of the disclosure. Such code can be stored in memory devices operable with each of the channel change predictor 208, the usage pattern modeler 209, the flap detector 210, and the program popularity calculator 211. The software code can embody program instructions and methods to operate the various functions of the server structure 101 configured in accordance with embodiments of the disclosure, and also to execute software or firmware applications and modules. The one or more processors can execute this software or firmware to provide device functionality. Each of channel change predictor 208, the usage pattern modeler 209, the flap detector 210, and the program popularity calculator 211 may be external to the server structure 101 or may be included within the server structure 101.

Just as the analytics engine 207 can be operable with the historical data database 212, in one or more embodiments the usage/telemetry data collector 108 is operable with a monitored data database 222. Each of the monitored data database 222 and the historical data database 212 may include either or both static and dynamic memory components, may be used for storing both embedded code and system data. In one or more embodiments, each of the monitored data database 222 and historical data database 212 has stored therein data corresponding to channel usage and switching characteristics between channels based upon the operation of the client groups 204,205,206 operating in the various zones 201,202,203.

In one or more embodiments, the analytics engine 207, working with the channel change predictor 208, the usage pattern modeler 209, the flap detector 210, the program popularity calculator 211, and the usage/telemetry data collector 108 perform various functions. Beginning with the usage/telemetry data collector 108, in one embodiment the usage/telemetry data collector 108 performs a collection of channel usage data. In one embodiment, the usage/telemetry data collector 108 collects real time data at periodic intervals, such as once every ten minutes. Advantageously, this spaced, periodic interval collection process reduces loading on the system 100. Additionally, it provides more flexibility on the frequency of data collection.

In one or more embodiments, the channel change predictor 208 is operable to determine channel change patterns from data received from the client groups 204,205,206 operating in the various zones 201,202,203. In one embodiment, the channel change predictor 208 is further operable to determine channel "surfing patterns" from data received from the client groups 204,205,206 operating in the various zones 201,202,203. For example, in one embodiment the channel change predictor 208 performs analytics on the data received from the client groups 204,205,206 operating in the various zones 201,202,203 to determine probabilities that predict actions such as when multiple viewers change a channel at a given time on a given day and/or based on a current program.

In one or more embodiments, the channel change predictor 208 is operable to determine factors such as statistics relating to channel join data. For example, in one embodiment the channel change predictor 208 performs analytics on the data received from the client groups 204,205,206 operating in the various zones 201,202,203 to determine probabilities that predict actions such as when multiple viewers tune to a channel at a given time on a given day and/or based on a current program. The channel change predictor 208 can thus predict what the viewership of a particular channel will be during a predefined future period, such as in the next two minutes, three minutes, five minutes, or more minutes.

The channel change predictor 208 can perform other functions as well. In one embodiment, the channel change predictor 208 predicts the probability relating to when a particular channel will be changed, as determined when a client device leaves one channel and joins another. The channel change predictor 208 can access historical data stored in the historical data database 212, along with input from the program popularity calculator 211, to predict the probability relating to when a particular channel will be changed.

In addition to predicting the probability relating to when a particular channel will be changed, the channel change predictor 208 can also predict event such as channel join events. Channel join events can be used to determine a probability that one or more client devices will tune to a particular channel at a given point in time during the day.

The channel change predictor 208 can also predict event such as channel leave events. Channel leave events can be used to determine a probability that one or more client devices will tune away from a particular channel at a given point in time during the day.

The channel change predictor 208 can also predict event such as channel flipping events. Illustrating by example, in one or more embodiments the channel change predictor 208 can determine when one or more client devices will tune away from, and then back to, a particular channel during an advertisement. The placement of advertisements can be identified from markers. In one embodiment, markers are Society of Cable Telecommunications Engineers (SCTE)-35 cue packets placed within the content offering. A marker may comprise, for example, an SCTE-35 cue packet in an MPEG-2 stream. While SCTE-35 markers can be used, other markers will readily be obvious to those of ordinary skill in the art having the benefit of this disclosure. For example, other markers may include a Dual Tone Multi-Frequency (DTMF) tone sequence in a digital or analog content offering, a Gigabit PoE Injector (GPI) contact closure in a GPI relay from the equipment such as a satellite receiver, or via some other marker.

Additionally, the channel change predictor 208 can predict viewership of a predefined channel in the next few minutes. The channel change predictor 208 can also predict whether client devices will change channels or programs based upon electronic program guide metadata from the electronic program guide metadata manager 213. The channel change predictor 208 can also predict viewership and channel surfing patterns of individual users on an aggregated basis to predict an informed decision about a channel change at any geographical zone and time frame.

The usage pattern modeler 209 can work to find different usage patterns that are essential to predict channel usage. In one embodiment, the usage pattern modeler 209 can consult data stored in the historical data database 212 to find patterns at the granularity level of a user. One example of such a pattern would be whether the user is binge watching a particular show, watching randomly, or following a typical schedule that is a function of the date and time. Another example of a pattern would be favorite programs and channels of the user. Another example of a pattern would be whether the user is frequent switching channels, steadily watching channels, or only switching channels during advertisements. Another example of a pattern would be whether a particular user only watches sports, only watches news, or only watches reality shows, and so forth. These are but examples of patterns, as numerous others will be obvious to those of ordinary skill in the art having the benefit of this disclosure.

The flap detector 210 is operable to receive data from the client groups 204,205,206 operating in the various zones 201,202,203 to determine flapping thresholds. In one or more embodiments, the flapping thresholds define points where channels in the group being multicast by the one or more servers 214,215,216 of the multicast server 106 having flapping frequencies less than the flapping threshold. These channels are deemed to be stable and should not be removed from the group being multicast by the one or more servers 214,215,216 of the multicast server 106. By contrast, channels in the group being multicast by the one or more servers 214,215,216 of the multicast server 106 having flapping frequencies above the flapping threshold are inherently prone to flapping and may need to be removed from the group being multicast by the one or more servers 214,215, 216 of the multicast server 106.

The flap detector 210 can perform other functions as well. In one embodiment, for example, the flap detector 210 can analyze historical data stored in the historical data database 212. From this data, in one embodiment the flap detector 210 can determine a flapping threshold for a particular zone, e.g., zone 201, for a particular time frame. Where channel flapping exceeds the flapping threshold, the flap detector 210 can predict when the channels need to be swapped out from the group being multicast by the one or more servers 214,215,216 of the multicast server 106.

In one or more embodiments, the decision of whether to swap out a particular channel from the group being multicast by the one or more servers 214,215,216 of the multicast server 106, i.e., where a flapping threshold is defined, can be based upon one or more objective factors. For instance, one factor is whether advertisements are happening during that time. A second factor is whether viewers who are tuned into that channel have a history of channel flapping. A third factor is the type of program that is being telecast at that time. A fourth factor is whether there is an imminent change in the type of the program. These factors are illustrative only, as others will be readily apparent to those of ordinary skill in the art having the benefit of this disclosure.

The flap detector 210 can perform other functions as well. For instance, based upon historical channel change events determined by analyzing historical data stored in the historical data database 212, in one or more embodiments the flap detector 210 can predict flapping thresholds for each zone 201,202,203 and time frame. Additionally, using data from the channel change predictor 208, the flap detector 210 can, for channels exhibiting more flapping that the flapping threshold, predict if a channel needs to be kept in the group being multicast by the one or more servers 214,215,216 of the multicast server 106 even though flapping causes the channel to fall out of the "most popular" list temporarily. The flap detector 210 can also use data from the usage/telemetry data collector 108 to augment this decision.

The program popularity calculator 211 can reference and analyze data stored in the historical data database 212 to determine the popularity of content offerings delivered to client groups 204,205,206 operating in the various zones 201,202,203. The program popularity calculator 211 can also receive electronic program guide metadata from the electronic program guide metadata manager 213 to determine the popularity of content offerings delivered to client groups 204,205,206 operating in the various zones 201,202, 203.

Illustrating by example, in one embodiment the program popularity calculator 211 can, based upon an individual's watching patterns, determine which content offerings are of interest to the individual. Accordingly, the program popularity calculator 211 can predict content offerings that a particular individual may watch during the day. These predictions, when combined with the electronic program guide metadata from the electronic program guide metadata manager 213, can be used to predict the channels that various users will watch during given times of day.

In one embodiment, the analytics engine 207 is operable with electronic program guide metadata provided by the electronic program guide metadata manager 213. The electronic program guide metadata provides details relating to the content (102) such as genre, rating, cast, title, channel, timestamp/program schedule, and so forth. Accordingly, in one or more embodiments the analytics engine 207 can use the electronic program guide metadata to build predictive models on a per program and/or channel basis. Additionally, in one or more embodiments the analytics engine 207 can derive insights into program and/or channel popularity and the viewers likes/dislikes based upon the electronic program guide metadata.

Illustrating by example, if the analytics engine 207 determines from the electronic program guide metadata that a particular viewer regularly tunes to network X at seven in the evening on Mondays, e.g., from the usage pattern modeler 209, the analytics engine 207 can consult the electronic program metadata to determine that the program occurring at that time is Program Y. Accordingly, the analytics engine 207 can derive that the viewer likes that program. Moreover, the analytics engine 207 can predict that the viewer is likely to watch that program when it telecasts at a future date and time (typically, the electronic programming guide provides programming schedule for the next 14 days). Thus, the analytics engine 207, working with the usage pattern modeler 209, can predict a given program's usage in the future.

In one or more embodiments, the analytics engine 207 and/or its various subcomponents can retrieve, consult, or otherwise analyze data stored in the historical data database 212. In so doing, the analytics engine 207 and/or its various subcomponents can derive insights and viewing patterns by tracking and mining this historical data. Accordingly, in one or more embodiments, the historical data database 212 tracks and stores data from the monitored data database 222 so that it can be analyzed for the long term.

As noted above, the flapping thresholds, channel change probabilities, and usage pattern probabilities can be predicted at the granular level of each zone 201,202,203 in one embodiment. In other embodiments, the flapping thresholds, channel change probabilities, and usage pattern probabilities can be predicted at the gateway level. In still other embodiments, the flapping thresholds, channel change probabilities, and usage pattern probabilities can be predicted at the user group level. In still other embodiments, the flapping thresholds, channel change probabilities, and usage pattern probabilities can be predicted at the can be predicted at the individual client device level. Of course, combinations of these granularities can be used as well.

The analytics engine 207, working with the channel change predictor 208, the usage pattern modeler 209, the flap detector 210, and the program popularity calculator 211, creates one or more channel maps 218,219,220,221 that define and set forth the best channels for the one or more servers 214,215,216 of the multicast server 106 to multicast to the client groups 204,205,206 operating in the various zones 201,202,203 for each time period of a day. The analytics engine 207, in one embodiment, predicts channel maps 217 at a neighborhood/zone level granularity. For example, one channel map 218 can be for a particular zone 201, while another channel map 219 can be for another zone 202. Similarly, a first channel map 219 can be for a particular zone 202 during a first time of day, while another channel map 221 can be for the same zone 202 during a second time of day.

The operation of the analytics engine 207 can complement or replace conventional real time channel monitoring mechanisms operating in the system 100. Illustrating by example, when the analytics engine 207 predicts that channel X is going to be a popular channel at a particular time, the analytics engine 207 can add channel X to one or more channel maps 217 automatically at the appropriate time. This allows any real time channel monitoring mechanisms to stop monitoring channel X and instead monitor other channels. This allows the real time channel monitoring mechanism to reduce the number of channels it monitors.

The operation of the analytics engine 207, in conjunction with the channel change predictor 208, the usage pattern modeler 209, the flap detector 210, and the program popularity calculator 211, also eliminates or reduces flapping problems that exist in conventional real time channel monitoring mechanisms. The analytics engine 207 also helps to improve efficiency and save bandwidth and network costs in delivery of content (102) to multi-screen devices. In an embodiment that collects data from gateways (103) and stores the data in the historical data database 212 for long term historical analytics, the analytics engine 207 can be implemented using collected or existing data and electronic program guide metadata from the electronic program guide metadata manager 213 and, for example, using big-data technologies such as Spark and Hadoop. to create models, e.g., machine learning, can be implemented in the analytics engine 207 to understand usage patterns.

In one or more embodiments, the analytics engine 207 uses historical data stored in the historical data database 212 to prepare channel maps 217 for zones 201,202,203 across various times of day. The analytics engine 207 further determines flapping thresholds to address the flapping problem referenced above. The analytics engine 207, in one or more embodiments, also solves two problems simultaneously, namely, selecting the optimal channel maps 217 at a particular time for a particular zone 201,202,203 and group of subscribers so as to operate the system 100 more efficiently, and reducing the amount of traffic across the network 104, by determining channel usage and addressing the additional "burstiness" caused by the protocol changes to and from unicast modes of operation. Further, the analytics engine 207 provides for the use of historical data stored in the historical data database 212 to determine popular channels in constructing the channel maps 217, in combination with the use of analytics, to reduce a burden on the usage/telemetry data collector 108 and to predict channel maps 217 to reduce flapping. Other advantages will be obvious to those of ordinary skill in the art having the benefit of this disclosure.

Figure 3:
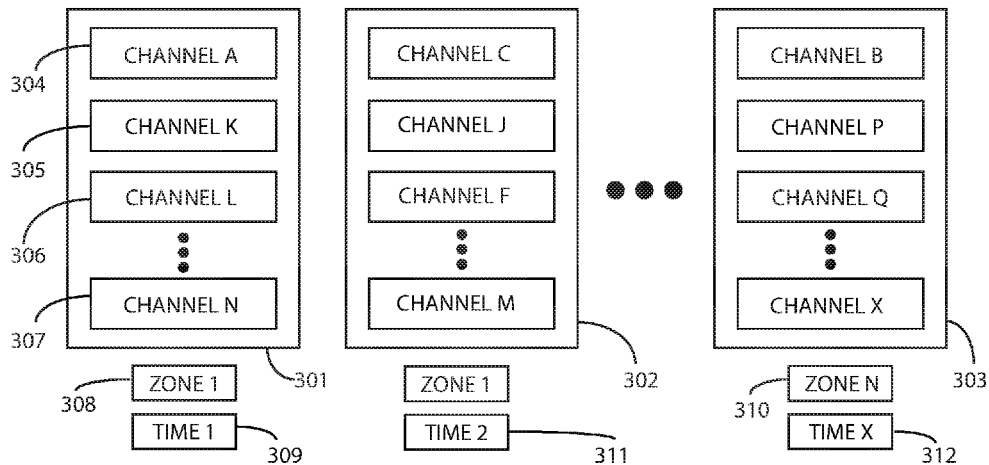
FIG. 3 illustrates one or more explanatory channel maps in accordance with one or more embodiments of the disclosure.

Turning now to FIG. 3, illustrated therein are one or more examples of channel maps 301,302,303 in accordance with one or more embodiments of the disclosure. As shown, each channel map 301,302,303 includes one or more channels 304,305,306,307 that are to be multicast by the multicast server (106). Each channel map 301,302,303 can be created for different zones 308,310 for various times 309,311,312 of day. The channel maps 301,302,303 define and set forth the best channels 304,305,306,307 for the one or more servers (214,215,216) of the multicast server (106) to multicast to the client groups (204,205,206) operating in the various zones (201,202,203) for each time period of a day. The channel maps 301,302,303 of FIG. 3 are created at a neighborhood/zone level granularity for various times 309, 311,312 of the day.

Figure 4:
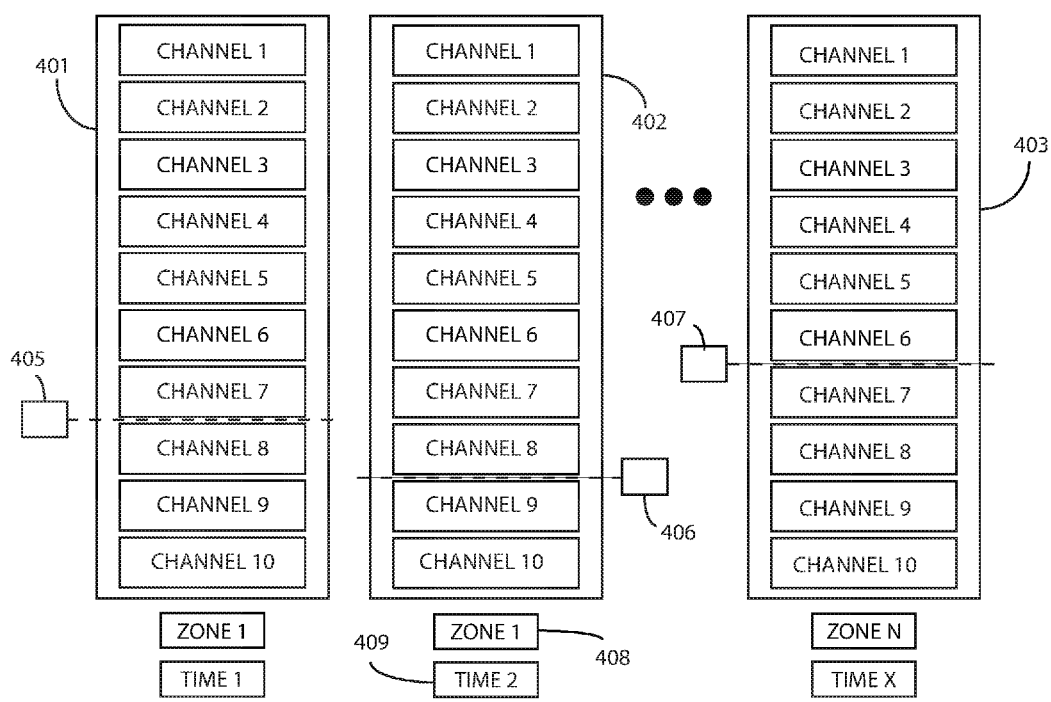
FIG. 4 illustrates one or more explanatory channel maps and one or more explanatory flapping thresholds in accordance with one or more embodiments of the disclosure.

Turning now to FIG. 4, illustrated therein are channel maps 401,402,403 for which flapping thresholds 405,406, 407 have been defined as described above. To illustrate how these flapping thresholds 405,406,407 address the flapping problem, a use case is in order.

As shown in FIG. 4, channel 9 is below the flapping threshold 406 for channel map 402. However, channel 9 is one of the "top ten" channels being multicast by a multicast server in zone 408 at time 409. Presume for the sake of illustration that time 409 is 7:28 PM and zone 408 is the San Francisco Bay area. The analytics engine (207) identifies that a number of client devices are changing the channel starting at 7:29 PM. Using a prior art system, this changing of channels would traditionally cause channel 9 to fall out of the top ten. Accordingly, users would be required to switch to a unicast mode of operation to continue receiving channel 9.

However, here channel 9 is below the flapping threshold. Since the system has identified that the flapping will be higher than the threshold, the analytics engine (207) performs an additional analysis to confirm whether channel 9 should remain in the channel map 402. Illustrating by example, the analytics engine (207) may determine that many client devices switch channels during advertisements by analyzing historical data stored in the historical data database (212). The analytics engine (207) may further determine from the electronic program guide metadata provided by the electronic program guide metadata manager (213) that channel 9 is broadcasting the Buster and Mackie Variety Show from 7:00 PM to 7:30 PM, with another thrilling episode of the Buster and Mackie Variety Show airing between 7:30 PM and 8:00 PM. The analytics engine (207) may also determine from the historical data in the historical data database (212) that the flapping client devices typically tune into the Buster and Mackie Variety Show to see the antics of two of the cast members, Little Bit and Sideshow Henry. Where these three items are confirmed, the analytics engine (207) would elect to keep channel 9 in the channel map 402 despite it falling out of the top ten because client devices that have temporarily shifted to a different channel to avoid advertisements and will soon tune back to channel 9 to watch the next episode of the Mackie and Buster Variety Hour. Accordingly, the definition of a flapping threshold 406, combined with analysis of channels above the flapping threshold 406, avoids channel 9 from "flapping" in and out of the channel map 402. The flapping issue for channel 9 is thus resolved.

A similar process can be applied to channels above the flapping threshold. Illustrating by example, in FIG. 4 channel 6 is above the flapping threshold 406 in channel map 402. Presume the analytics engine (207) determines from the electronic program guide metadata provided by the electronic program guide metadata manager (213) that the content offering being delivered on channel 6 at time 409 is a local football game. The analytics engine (207) then confirms that most fans of this local football team are located within zone 408. The analytics engine (207) can then reference historical data in the historical data database (212) to determine that client devices will be tuned to channel 6 at various times during time 409. Accordingly, in one or more embodiments the analytics engine (207) ensures that channel 6 remains in channel map 402 regardless of any other action that might indicate otherwise, e.g., instantaneous popularity data, during time 409.

The flapping issue can be addressed in other ways as well. Illustrating by example, advertisement schedules in accordance with the Cable Computerized Management System (CCMS) protocol provide schedules of when advertisements will air on a per channel basis. These schedules are traditionally used to allow insertion of advertisement avails into programming. However, in accordance with one or more embodiments of the disclosure, the analytics engine (207) can monitor CCMS advertisement schedules to prevent flapping.

Illustrating by example, in one or more embodiments the analytics engine (207) can monitor the CCMS advertisement schedules for any channel found in a multicast map 401, 402,403. The CCMS advertisement schedules indicate advertisement schedules for each program in advance. The analytics engine (207) can predict flapping by determining when an upcoming advertisement will occur. Accordingly, simply by identifying advertisement times, the analytics engine (207) can prevent flapping on channels at the scheduled advertisements.

Once the channel flapping noise quiets down after an advertisement, the analytics engine (207) can again start consulting other data, such as the historical data stored in the historical data database (212) to determine if a certain popular program has ended and allow the system (100) to lower the popularity ranking of that channel so that it can be demoted from multicast to unicast as needed.

It should be noted that the consideration of both CCMS advertising schedules and historical data stored in the historical data database (212) is a very powerful tool that provides serious advantages over prior art systems in that it allows the overall system (100) to remain in a stable, steady state of multicasting by eliminating flapping during advertisement insertions while allowing the historical data to be used to continue making adjustments to popularity after the noise has died down. Additionally the historical data of the historical data database (212) can be used to even change popularity ratings or the flapping thresholds 405,406,407 just before an advertisement begins, as well as to switch multicasting operations to channels that will become popular just after the advertisement. The analytics engine (207) can determine whether to adjust the flapping thresholds 405,406, 407 before or after advertisements.

Figure 5:
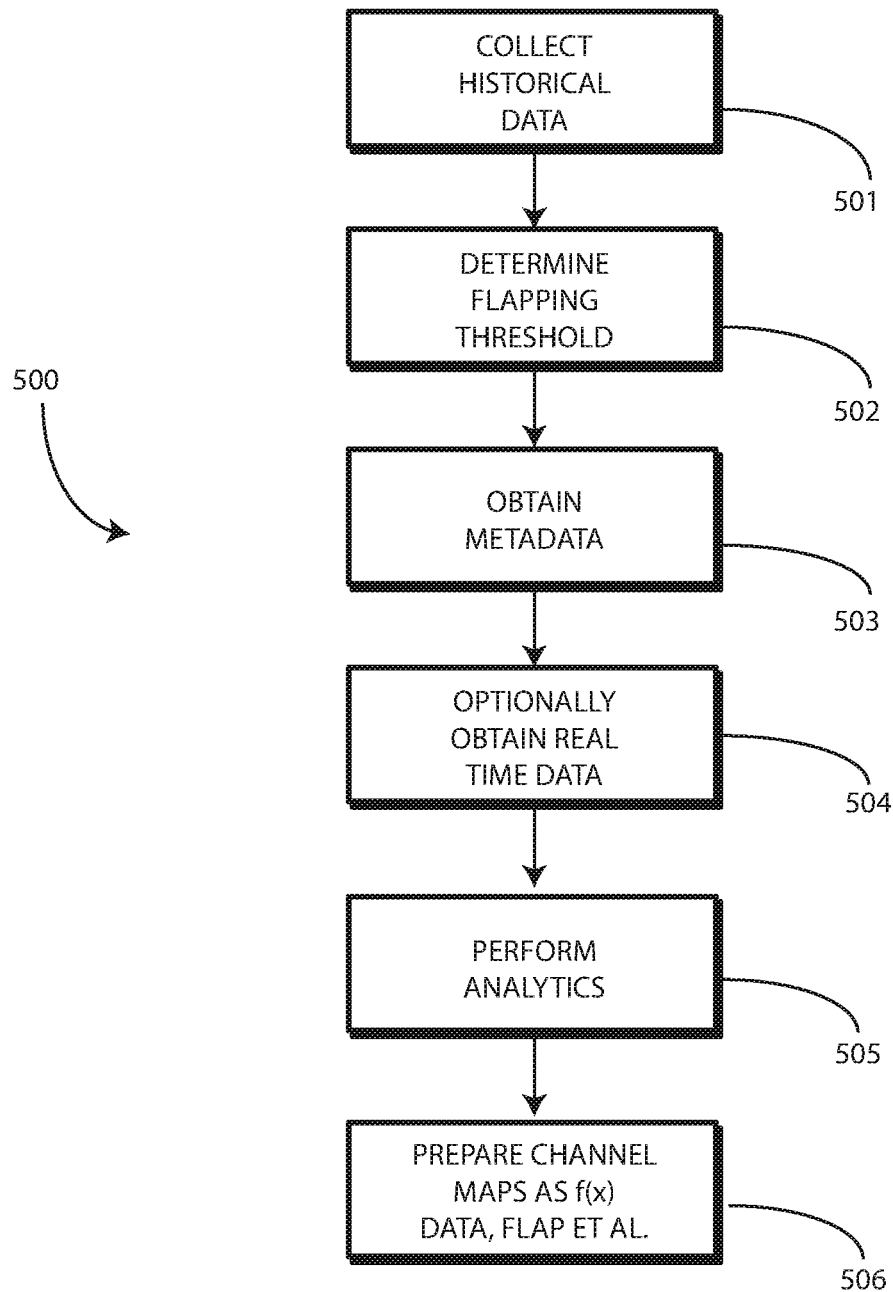
FIG. 5 illustrates one explanatory method in accordance with one or more embodiments of the disclosure.

Turning now to FIG. 5, illustrated therein is one explanatory method 500 in accordance with one or more embodiments of the disclosure. In one or more embodiments, the method 500 uses a combination of real time and historical data to prepare one or more multicast channel maps at a geographical zone and/or time of day granularity. The method 500 predicts one or more flapping thresholds to address flapping problems. The method 500 results in better use and/or efficiency of multicast services while saving bandwidth and network costs in multicast adaptive bit rate content delivery systems.

Figure 6:
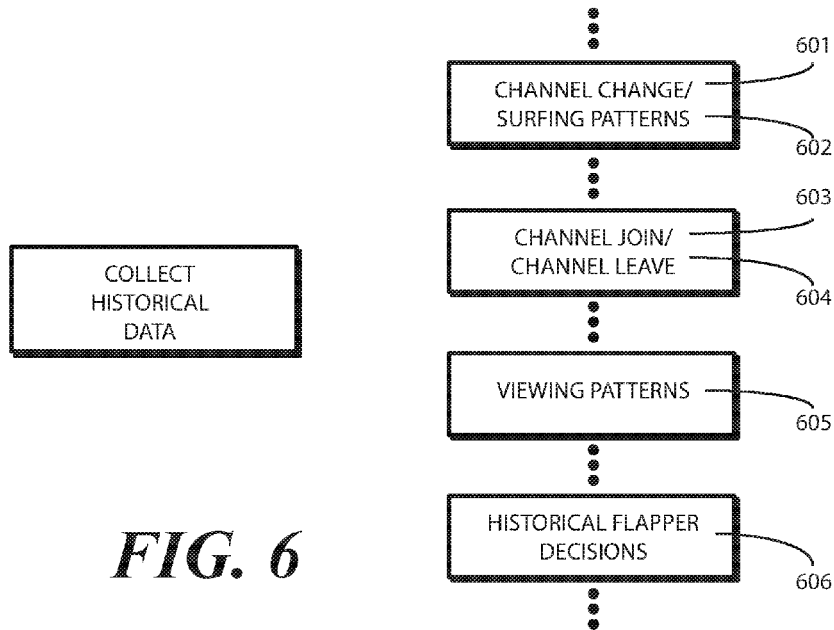
FIG. 6 illustrates one or more explanatory method steps in accordance with one or more embodiments of the disclosure.

Beginning at step 501, the method 500 collects historical data. Turning briefly to FIG. 6, illustrated therein are some examples of historical data. This historical data can include channel changing patterns 601, channel surfing patterns 602, channel join events 603, and channel leave events 604. The historical data can also include viewership data 605 for various channels at various times and historical flapping decisions 606. Other types of historical data will be obvious to those of ordinary skill in the art having the benefit of this disclosure.

Figure 7:
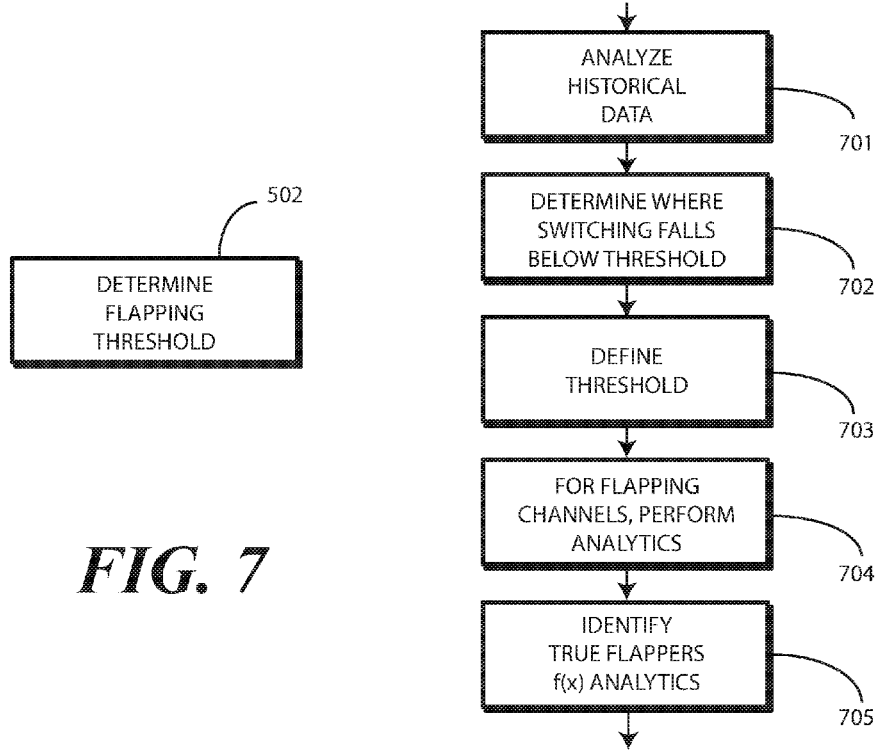
FIG. 7 illustrates one or more explanatory method steps in accordance with one or more embodiments of the disclosure.

Turning back to FIG. 5, at step 502 the method 500 determines a flapping threshold. In one embodiment, the flapping threshold defines the point where the channels in the multicast group above it do not exhibit flapping and channels below it are prone to flapping. Turning briefly to FIG. 7, in one embodiment step 502 comprises analyzing 701 historical data to determine 702 where channel switching falls below a certain predetermined threshold. Step 502 then comprises determining 703 a flapping threshold for a particular zone for a particular time frame. In one embodiment, step 502 comprises additional analytics 704, such as determining whether viewers who are tuned to a channel have a history of channel switching. In one embodiment, step 502 comprises determining a type of program being delivered on a channel and determining if there is an imminent change in the program or type of program that is about to occur. From this information, step 502 can distinguish 705 between truly flapping channels and those that only momentarily flap for reasons such as advertisements.

Figure 8:
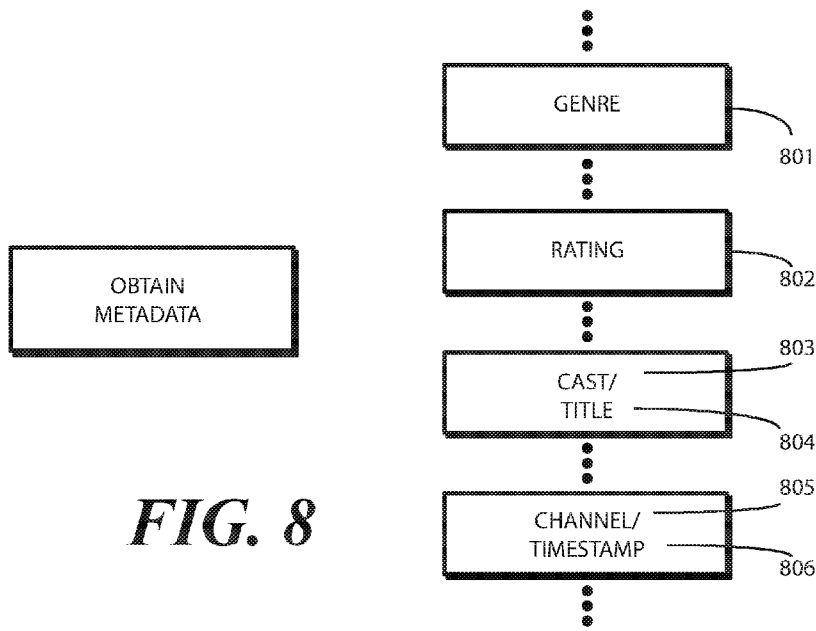
FIG. 8 illustrates one or more explanatory method steps in accordance with one or more embodiments of the disclosure.

Turning back to FIG. 5, at step 503 in one embodiment the method 500 gathers electronic program guide metadata. Turning briefly to FIG. 8, the electronic program guide metadata provides details such as genre 801, rating 802, cast 803, title 804, channel 805, timestamp 806, and so forth. This electronic program guide metadata can be used to build predictive models on a per program basis. The electronic program guide metadata can also be used to derive insights into program popularity, viewership likes, and viewership dislikes. For instance, if the electronic program guide metadata shows that program X is being shown on channel Y at time Z, the method 500 can conclude that viewers watching program X like this program. Accordingly, the method 500 can predict that viewers are likely to watch that program when it telecasts at a future date and time to predict a given program's usage in future.

Turning now back to FIG. 5, at step 504 the method 500 optionally determines real time data. This can include numbers of viewers watching each channel in one or more embodiments. Where step 504 is included, in one or more embodiments it is performed at periodic intervals with breaks in between rather than on a continual basis. For example, in one embodiment step 504 occurs at "near" real time intervals, e.g., once a minute, as opposed to "true" real time intervals, e.g., every ten seconds. Performing near real time data collection instead of true real time will reduce the load on the system and provide more flexibility on the frequency of data collection.

Figure 9:
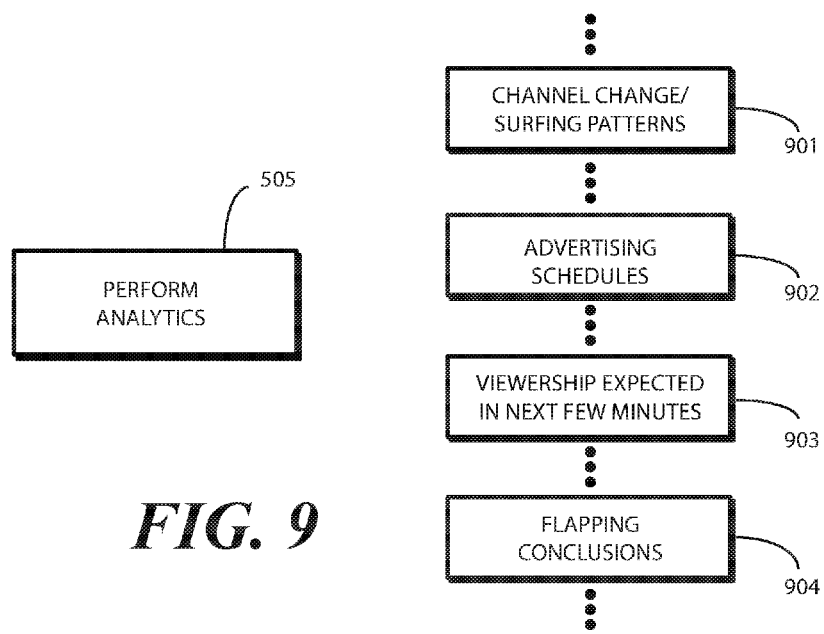
FIG. 9 illustrates one or more explanatory method steps in accordance with one or more embodiments of the disclosure.

At step 505, in one embodiment the method 500 performs analytics on the data and thresholds collected and determined at steps 501-504. In one or more embodiments, step 505 performs analytics on a weighted sum of real time and historical data to determine which channels should be multicast and which channels should be delivered via unicast. For example, turning briefly to FIG. 9, step 505 can include analyzing 901 channel change and channel surfing patterns, analyzing 902 CCMS advertisement schedules, analyzing 903 viewership changes expected in the next few minutes, and distinguishing 904 between truly flapping channels and those that merely appear to flap.

Turning back to FIG. 5, at step 506 the method 500 generates one or more channel maps indicating which channels should be multicast, and delivers these channel maps to a multicast server. The steps of the method 500 can be repeated on an as needed basis.

Embodiments of the disclosure provide distinct advantages over prior art solutions. Illustrating by example, one prior art solution includes a facility to provide dynamic multicast management to achieve higher access network bandwidth efficiencies based on real time monitoring of viewership patterns. This prior art reference is incapable of providing numerous advantages offered by embodiments of the disclosure, including the solution of the flapping issue. Additionally, this prior art system does not use historical data to create popularity prediction models. The prior art system also does not use analytics to create dynamic multicast channel map schedules in advance. Instead, the prior art system merely uses programming ratings compiled by companies such as Nielsen to create a static channel map manually that does not change. Moreover, since embodiments of the disclosure to not require true real time data analysis, less strain is placed upon user gateways.

In another prior art system, cross-platform predictive popularity ratings information is used. However, this requires interactive television applications operating on one platform, e.g., an on-line platform that monitors user interactions with a television application to obtain cross-platform data. This data, in turn, may be used to determine predictive popularity ratings information.

However, this prior art system—again—fails to address the flapping issue. Moreover, the prior art system requires a costly and cumbersome interactive application in each and every client device to monitor user interactions with the television or multi-screen apparatus. By contrast, embodiments of the present disclosure employ analytics to dynamically alter multicast channel maps to provide access network efficiencies. Additionally, embodiments of the disclosure provide feedback loops to continually refine the channel maps that are not used in the prior art system.

Another prior art system allocates bandwidth to a video channel in a switched digital video system based on real time monitoring of viewer interest in that channel. Trending information is used to determine whether or not to allocate bandwidth. However, this trend analysis is based on viewer interest monitored from the time the channel has been allocated or the trending in interest just before the channel is allocated, i.e., real time trending. There is no long term trending of historical data as there is in embodiments of the present disclosure. Moreover, embodiments of the present disclosure differ from this system in that they address the flapping issue that pervades the prior art system. Additionally, embodiments of the disclosure employ historical data to create popularity prediction models and multicast channel maps in advance.

Another prior art system allocates bandwidth to a video channel in a switched digital video system based on real time monitoring of viewer interest in that channel. In contrast to embodiments of the present disclosure, this prior art system cannot address the flapping issue, and does not use historical data to create popularity prediction models and schedules in advance.

Another prior art system provides an architecture for multicast of adaptive bit rate video over an IP-based access network. The system fails to address the flapping issue, as do embodiments of the present disclosure. Additionally, this prior art system fails to update channel maps or provide methods of analyzing historical usage data.

Another prior art system includes aggregating resource availability from a plurality of network elements operating in a network, receiving a request to apply a policy to a network flow propagating in the network, and orchestrating resources to apply the policy to the network flow based on the aggregated resource availability. In addition, the policy can include relocating subscribers accessing common content from a first gateway to a second gateway. However, this system fails to consider historical usage information and does not address the flapping problem noted above.

Another prior art system includes establishing a connection between a client and a messaging fabric associated with a video system that includes a metadata broker element and storing metadata information associated with content, where the content is associated with a release uniform resource locator. The system then generates a content guide that includes a plurality of content definitions. As with other prior art systems, this one does not consider electronic program guide data to proactively manage potential issues caused by rapid channel changes. Further, this system fails to address the flapping problem that taxes resources when they are switched between unicast and multicast.

Another prior art system provides for policy-based dynamic preemptive scheduling of data transmissions within such communication systems. To address the need for protecting the Quality of Service (QoS) of high priority flows in a communication network when network conditions vary, a bandwidth allocation adaptor modifies original queue weights (B). The modification of the original queue weights is based, in part, on channel conditions. However, this prior art system is based on QoS, rather than on historical usage analytics to define the transmission schedule. The flapping problem remains unsolved in this prior art system as well.

In another prior art system, restricted broadcast groups are established in a switched network. The method assigns different virtual local area network identifiers (VLAN-IDs) to different subsets of associated end systems or access ports. Tables are maintained for mapping the VLAN-IDs with associated end systems and access ports. The system provides a mechanism for forwarding broadcast packets of a protocol not supported by the switching mechanism, as well as multicast packets and unicast packets from undiscovered end systems. Unlike embodiments of the present disclosure, the mapping tables aren't defined by analytics on historical usage data. Moreover, the system fails to address the flapping problem. What's more, the prior art system fails to address bandwidth issues associated with switching between local area network operation and multicasting.

Figure 10:
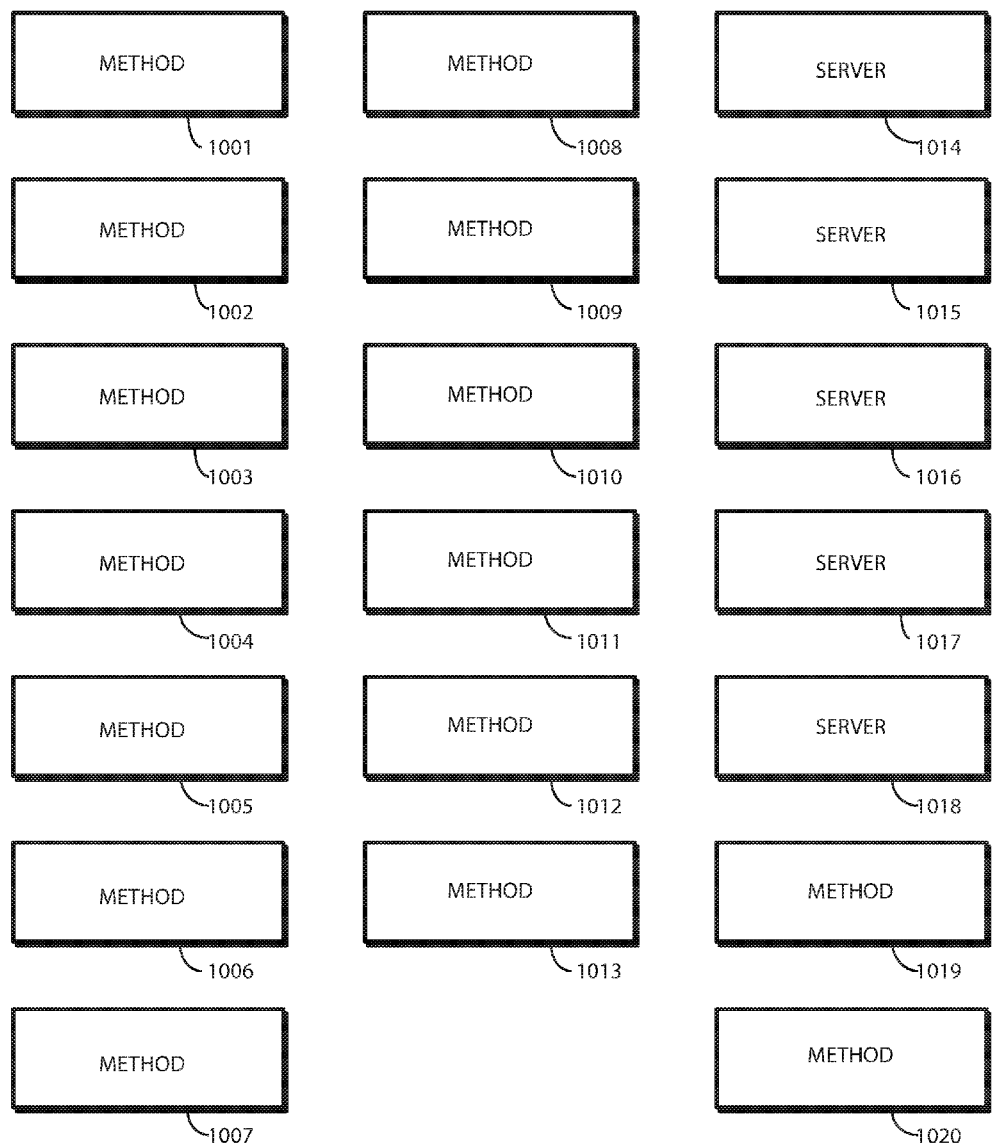
FIG. 10 illustrates various embodiments of the disclosure.

Turning to FIG. 10, illustrated therein are various embodiments of the disclosure. At 1001, a method comprises obtaining, with an analytics engine of a server structure of an adaptive bit rate content delivery system where the server structure comprising a multicast server, historical data corresponding to one or more channels offered by the server structure. At 1001, the method comprises receiving, with the analytics engine, at least some near real time data corresponding to content offerings available on the one or more channels. At 1001, the method comprises determining, with the analytics engine, one or more channel maps as a function of both the historical data and the at least some near real time data. At 1001, the one or more channel maps identify a group of channels of the one or more channels that will be delivered by the multicast server.

At 1002, the determining occurring in the method of 1001 occurs on a zone-by-zone basis. At 1003, the method of 1001 further includes determining, with a flap detector of the analytics engine, at least one flapping threshold for the group of channels that will be delivered by the multicast server. At 1003, the method of 1001 further includes analyzing channels flapping in excess of the at least one flapping threshold to determine whether they should remain in the group of channels that will be delivered by the multicast server.

At 1004, at least some near real time data of 1003 comprises electronic program guide metadata. At 1005, the electronic program guide metadata of 1004 identifies one or more of a genre of the content offerings available on the one or more channels, a rating of the content offerings available on the one or more channels, a cast of the content offerings available on the one or more channels, a title of the content offerings available on the one or more channels, a channel of the content offerings available on the one or more channels, or a timestamp of the content offerings available on the one or more channels.

At 1006, the method of 1003 further comprises determining, with a channel change predictor, one or more of the following: channel change patterns from data received from the client groups; and channel surfing patterns from the data received from the client groups. At 1006, the determining the one or more channel maps occurs further as a function of one or both of the channel change patterns or the channel surfing patterns.

At 1007, the method of 1003 further comprises determining, with a channel change predictor, one or more of the following: channel join events of the client groups; and channel leave events of the client groups. At 1007, the determining the one or more channel maps occurs further as a function of one or both of the channel join events or the channel leave events.

At 1008, the method 1003 further comprises determining, with a channel change predictor, channel flipping events occurring as a function of channel advertisement placement. At 1008, the determining the one or more channel maps occurs further as a function of the channel flipping events.

At 1009, the method of 1003 comprises predicting, with a channel change predictor, predicted viewership of a predefined channel within a predefined future time period. At 1009, the determining the one or more channel maps occurs further as a function of the predicted viewership.

At 1010, the determining of the flapping threshold occurring at 1003 comprises identifying whether advertisements are occurring while a channel is flapping. At 1011, the determining of the flapping threshold occurring at 1003 comprises identifying whether viewers tuned to a flapping channel have a history of channel flapping. At 1012, the determining of the flapping threshold occurring at 1003 comprises identifying a type of program that is being telecast on a flapping channel. At 1013, the determining of the flapping threshold occurring at 1003 further comprises determining whether there is an imminent change in the type of the program.

At 1014, a server structure comprises one or more multicast servers. At 1014, the server structure comprises an analytics engine determining one or more channel maps identifying a group of channels that will be delivered by the one or more multicast servers across a network. At 1014, the server structure comprises an electronic program guide metadata manager. At 1014, the analytics engine determines the one or more channel maps as a function of both historical data corresponding to one or more usage groups operating in one or more zones and electronic program guide metadata provided by the electronic program guide metadata manager.

At 1015, the analytics engine of 1014 comprises a flapping detector determining one or more flapping thresholds identifying channels in the group of channels delivered by the one or more multicast servers having flapping frequencies greater than the flapping threshold. At 1015, the flapping detector determines that at least one channel of the channels having flapping frequencies greater than the flapping threshold should remain in the group of channels delivered by the one or more multicast servers.

At 1016, the server structure of 1014 comprises a usage data collector collecting near real time data from one or more zones across the network. At 1016, the analytics engine determines the one or more channel maps additionally as a function of the near real time data.

At 1017, the server structure of 1014 further comprises a program popularity calculator determining a popularity of content offerings delivered to client groups across the network. At 1018, the server structure of 1014 further comprises a channel change predictor predicting one or more of channel change patterns of client groups served by the server or channel surfing patterns of the client groups.

At 1019, a method in an adaptive bit rate content delivery server structure comprises determining, with a flapping detector, at least one flapping threshold for a group of channels being delivered by a multicast server. At 1019, the method includes analyzing channels flapping in excess of the at least one flapping threshold based upon one or more criteria. At 1019, the method includes determining that at least one channel flapping in excess of the at least one flapping threshold should remain in the group of channels when a popularity of the at least one channel flapping in excess of the at least one flapping threshold decreases. At 1020, the method of 1019 further comprises analyzing one or more commercial occurrences occurring on one or more channels of the group of channels to determine the at least one flapping threshold.

While the principles of the invention have been described above in connection with specific devices, apparatus, systems, and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method, further comprising:
   obtaining, with an analytics engine of a server structure of an adaptive bit rate content delivery system, the server structure comprising a multicast server, historical data corresponding to one or more channels offered by the server structure;
   receiving, with the analytics engine, at least some near real time data corresponding to content offerings available on the one or more channels;
   determining, with the analytics engine, one or more channel maps as a function of both the historical data and the at least some near real time data, the one or more channel maps identifying a group of channels of the one or more channels that will be delivered by the multicast server;
   determining, with a flap detector of the analytics engine, at least one flapping threshold for the group of channels that will be delivered by the multicast server; and
   analyzing channels flapping in excess of the at least one flapping threshold to determine whether they should remain in the group of channels that will be delivered by the multicast server.

2. The method of claim 1, wherein the determining the one or more channel maps occurs on a zone-by-zone basis.

3. The method of claim 1, the at least some near real time data comprising electronic program guide metadata.

4. The method of claim 3, wherein the electronic program guide metadata identifies one or more of a genre of the content offerings available on the one or more channels, a rating of the content offerings available on the one or more channels, a cast of the content offerings available on the one or more channels, a title of the content offerings available on the one or more channels, a channel of the content offerings available on the one or more channels, or a timestamp of the content offerings available on the one or more channels.

5. The method of claim 1, further comprising determining, with a channel change predictor, one or more of the following:
   channel change patterns from data received from one or more client groups; and
   channel surfing patterns from the data received from the one or more client groups;
   wherein the determining the one or more channel maps occurs further as the function of one or both of the channel change patterns or the channel surfing patterns.

6. The method of claim 1, further comprising determining, with a channel change predictor, one or more of the following:
   channel join events of one or more client groups; and channel leave events of the one or more client groups;
wherein the determining the one or more channel maps occurs further as the function of one or both of the channel join events or the channel leave events.

7. The method of claim 1, further comprising determining, with a channel change predictor, channel flipping events occurring as a function of channel advertisement placement, wherein the determining the one or more channel maps occurs further as the function of the channel flipping events.

8. The method of claim 1, further comprising predicting, with a channel change predictor, predicted viewership of a predefined channel within a predefined future time period, wherein the determining the one or more channel maps occurs further as the function of the predicted viewership.

9. The method of claim 1, wherein the determining of the at least one flapping threshold comprises identifying whether advertisements are occurring while a channel is flapping.

10. The method of claim 1, wherein the determining of the at least one flapping threshold comprises identifying whether viewers tuned to a flapping channel have a history of channel flapping.

11. The method of claim 1, wherein the determining of the at least one flapping threshold comprises identifying a type of program that is being telecast on a flapping channel.

12. The method of claim 11, wherein the determining of the at least one flapping threshold further comprises determining whether there is an imminent change in the type of program.

13. A server structure, comprising:
one or more multicast servers; and
an analytics engine determining one or more channel maps identifying a group of channels that will be delivered by the one or more multicast servers across a network, the analytics engine determining the one or more channel maps as a function of both:
historical data corresponding to one or more usage groups operating in one or more zones, and
electronic program guide metadata;
the analytics engine comprising a flapping detector determining one or more flapping thresholds identifying channels in the group of channels delivered by the one or more multicast servers having flapping frequencies greater than the one or more flapping thresholds, and determining that at least one channel of the channels on the group of channels having the flapping frequencies greater than the one or more flapping thresholds should remain in the group of channels delivered by the one or more multicast servers.

14. The server structure of claim 13, further comprising a usage data collector collecting near real time data from the one or more zones across the network, the analytics engine determining the one or more channel maps additionally as a function of the near real time data.

15. The server structure of claim 13, further comprising a program popularity calculator determining a popularity of content offerings delivered to client groups across the network.

16. The server structure of claim 13, further comprising a channel change predictor predicting one or more of channel change patterns of client groups served by the one or more multicast servers or channel surfing patterns of the client groups.

17. A method in an adaptive bit rate content delivery server structure, the method comprising:
determining, with a flapping detector, at least one flapping threshold for a group of channels being delivered by a multicast server;
analyzing channels flapping in excess of the at least one flapping threshold based upon one or more criteria; and
determine that at least one channel flapping in excess of the at least one flapping threshold should remain in the group of channels when a popularity of the at least one channel flapping in excess of the at least one flapping threshold decreases.

18. The method of claim 17, further comprising analyzing one or more commercial occurrences occurring on one or more channels of the group of channels to determine the at least one flapping threshold.

* * * * *